· US009847563B2

United States Patent
Ochi et al.

(10) Patent No.: US 9,847,563 B2
(45) Date of Patent: Dec. 19, 2017

(54) POWER SUPPLY SYSTEM

(71) Applicant: SANYO Electric Co., Ltd., Osaka (JP)

(72) Inventors: Makoto Ochi, Hyogo (JP); Hiromasa Sugii, Hyogo (JP); Kazunobu Yokotani, Hyogo (JP); Fumio Yasutomi, Hyogo (JP); Noritake Okada, Osaka (JP)

(73) Assignee: SANYO ELECTRIC CO., LTD., Osaka (JP)

(*) Notice: Subject to any disclaimer, the term of this patent is extended or adjusted under 35 U.S.C. 154(b) by 106 days.

(21) Appl. No.: 15/033,901

(22) PCT Filed: Jan. 27, 2015

(86) PCT No.: PCT/JP2015/000338
§ 371 (c)(1),
(2) Date: May 2, 2016

(87) PCT Pub. No.: WO2015/151374
PCT Pub. Date: Oct. 8, 2015

(65) Prior Publication Data
US 2017/0125869 A1    May 4, 2017

(30) Foreign Application Priority Data
Mar. 31, 2014    (JP) .............................. 2014-071844

(51) Int. Cl.
H02J 7/00      (2006.01)
H01M 16/00     (2006.01)
(Continued)

(52) U.S. Cl.
CPC ......... H01M 16/00 (2013.01); B60L 11/1864 (2013.01); H01M 10/425 (2013.01);
(Continued)

(58) Field of Classification Search
USPC ......................................................... 320/126
See application file for complete search history.

(56) References Cited

U.S. PATENT DOCUMENTS 5,318,142 A * 6/1994 Bates ...................... B60K 6/28
                                                     180/65.245
5,769,177 A * 6/1998 Wickman ............... B60K 6/00
                                                      180/65.22
(Continued)

FOREIGN PATENT DOCUMENTS

WO        2013/157049       10/2013

OTHER PUBLICATIONS

International Search Report of PCT application No. PCT/JP2015/000338 dated Apr. 21, 2015.

Primary Examiner — Samuel Berhanu
(74) Attorney, Agent, or Firm — Wenderoth, Lind & Ponack, L.L.P.

(57) ABSTRACT

A first power storage section and a second power storage section are connected in parallel. The first power storage section includes a first non-aqueous electrolyte secondary battery. The second power storage section includes parallel-connected second non-aqueous electrolyte secondary batteries. Each of the second non-aqueous electrolyte secondary batteries has a higher energy density than that of the first non-aqueous electrolyte secondary battery. In a case where the second power storage section is discharged at a current value corresponding to a first assumed maximum discharge current value, the parallel-connected number of the second non-aqueous electrolyte secondary batteries is set such that a discharge rate of each of the second non-aqueous electrolyte secondary batteries becomes the preset reference discharge rate or less.

6 Claims, 4 Drawing Sheets

(51) Int. Cl.
*H01M 10/44* (2006.01)
*H01M 10/42* (2006.01)
*B60L 11/18* (2006.01)

(52) U.S. Cl.
CPC ......... *H01M 10/441* (2013.01); *H02J 7/0063* (2013.01); *H01M 2010/4271* (2013.01); *H01M 2220/20* (2013.01); *H02J 2007/0067* (2013.01)

(56) References Cited

U.S. PATENT DOCUMENTS

| | | | |
|---|---|---|---|
| 6,479,185 B1 * | 11/2002 | Hilderbrand | H01M 2/1077 |
| | | | 429/148 |
| 2001/0028238 A1 * | 10/2001 | Nakamura | G01R 31/3662 |
| | | | 320/132 |
| 2012/0133331 A1 * | 5/2012 | Ling | G01R 31/362 |
| | | | 320/132 |
| 2015/0097425 A1 | 4/2015 | Kimura et al. | |
| 2015/0246650 A1 * | 9/2015 | Nakajima | B60K 1/04 |
| | | | 180/68.5 |
| 2016/0016482 A1 * | 1/2016 | Lee | B60L 11/1861 |
| | | | 701/22 |
| 2016/0185205 A1 * | 6/2016 | Namuduri | B60K 6/28 |
| | | | 290/32 |
| 2016/0251828 A1 * | 9/2016 | Miyamoto | E02F 9/2079 |
| | | | 701/22 |
| 2016/0347183 A1 * | 12/2016 | Kusumi | B60L 11/00 |

* cited by examiner

FIG. 2

| INTERNAL RESISTANCE | | | | | | |
|---|---|---|---|---|---|---|
| | PRISMATIC LITHIUM ION BATTERY A (25.0Ah) | | | CYLINDRICAL LITHIUM ION BATTERY B (3.0Ah) | | |
| | SOC20% | SOC50% | SOC80% | SOC20% | SOC50% | SOC80% |
| 25°C | 1.95mΩ | 1.59mΩ | 1.63mΩ | 56.9mΩ | 40.7mΩ | 38.7mΩ |
| | INTERNAL RESISTANCE RATIO OF BATTERY B TO BATTERY A | | | 29.2 | 25.6 | 23.7 |
| −10°C | | 4.37mΩ | | | 93.4mΩ | |
| | INTERNAL RESISTANCE RATIO OF BATTERY B TO BATTERY A | | | | 21.4 | |

(a)

| INTERNAL RESISTANCE | | | | | | |
|---|---|---|---|---|---|---|
| | PRISMATIC LITHIUM ION BATTERY A (25.0Ah) | | | CYLINDRICAL LITHIUM ION BATTERY BB (2.0Ah) | | |
| | SOC20% | SOC50% | SOC80% | SOC20% | SOC50% | SOC80% |
| 25°C | 1.95mΩ | 1.59mΩ | 1.63mΩ | 37.0mΩ | 21.3mΩ | 21.2mΩ |
| | INTERNAL RESISTANCE RATIO OF BATTERY BB TO BATTERY A | | | 19.0 | 13.4 | 13.0 |

| CYLINDRICAL LITHIUM ION BATTERY B (3.0Ah) | | | |
|---|---|---|---|
| PARALLEL-CONNECTED NUMBER | SHARED CURRENT PER PARALLEL UNIT | DISCHARGE RATE | DISCHARGE RATE IS 5.0 C OR LESS |
| 1 PARALLEL | 40.0A | 13.3C | NG |
| 2 PARALLELS | 20.0A | 6.7C | NG |
| 3 PARALLELS | 13.3A | 4.4C | OK |
| ⋮ | | | |
| 8 PARALLELS | 5.0A | 1.7C | OK |
| 9 PARALLELS | 4.4A | 1.4C | OK |

POWER SUPPLY SYSTEM

CROSS REFERENCE TO RELATED APPLICATIONS

This application is a U.S. national stage application of the PCT International Application No. PCT/JP 2015/00038 filed on Jan. 27, 2015, which claims the benefit of the foreign priority of Japanese patent application 2014-071844 filed on Mar. 31, 2014, the contents all of which are incorporated herein by reference.

TECHNICAL FIELD

The present invention relates to a power supply system installed in a vehicle.

BACKGROUND ART

In recent years, hybrid cars, electric vehicles are being spread. A driving motor is installed in such a vehicle, and the secondary battery is also installed which supplies power to the driving motor and stores power regenerated from the driving motor. Generally, lithium ion batteries, nickel hydride batteries are used for the secondary battery for the vehicle. As a power supply system for the vehicle, a power supply system is proposed where different shapes of batteries are connected in parallel. For example, the power supply system is proposed where the prismatic battery and the cylindrical battery are connected in parallel (for example, refer to Patent Literature 1). When the prismatic battery and the cylindrical battery are compared, the prismatic battery has high output, and the cylindrical battery has high energy density. Accordingly, both batteries are connected in parallel, and then the assembled battery has high output and high energy density.

While, in the secondary battery, the high rate discharge accelerates degradation. When the secondary battery is discharged at high rate, its voltage is apt to irregularly change. It is possible to improve tolerance against the high rate discharge by appropriately selecting material composition of the battery, but it causes cost increase, decrease of batter property.

When a parallel system, where the secondary batteries having different shapes are connected in parallel, is designed, generally the capacity and the parallel-connected number of the secondary batteries in each of the shapes are determined based on the internal resistance ratio between the secondary batteries of the different shapes, such that the discharge rate in each of the secondary batteries becomes 4 to 8C or less. Here, the actual limit value of the discharge rate is generally equal to or less than 4C in the battery for a consumer usage, depending on material composition of the battery.

CITATION LIST

Patent Literature

Patent Literature 1: PCT Publication No. WO 2013/157049

SUMMARY OF THE INVENTION

However, the parallel-connected two batteries of the different shapes are not discharged at the same time or in the same way. Namely, currents do not flow, based on the internal resistance ratio which is compared or obtained in the same condition. According to the experiment by the inventors of the present invention, even when it is designed such that the discharge rate does not exceed a predetermined discharge rate based on the internal resistance ratio, it happens that the discharge rate of the one battery exceeds the predetermined discharge rate.

The present invention is developed for solving such problems, and its purpose is to provide a technology that a discharge rate of one secondary battery is prevented from becoming higher than a predetermined discharge rate in a system where secondary batteries are connected in parallel.

To solve the above-mentioned problems, a power supply system in one embodiment of the present invention, has: a first power storage section including a first non-aqueous electrolyte secondary battery; and a second power storage section connected to the first power storage section in parallel, and including a plurality of parallel-connected second non-aqueous electrolyte secondary batteries. The second non-aqueous electrolyte secondary batteries each have a higher energy density than that of the first non-aqueous electrolyte secondary battery. An internal resistance ratio of each of the second non-aqueous electrolyte secondary batteries to the first non-aqueous electrolyte secondary battery is set at a range of 10 to 35 inclusive. Based on an assumed maximum discharge current value of a parallel-connected system of the first power storage section and the second power storage section, and a first assumed maximum discharge current value of the first non-aqueous electrolyte secondary battery which is calculated from the internal resistance ratio, a capacity value of the first power storage section is set such that a discharge rate of the first non-aqueous electrolyte secondary battery becomes a preset reference discharge rate or less. Based on a second assumed maximum discharge current value of the second non-aqueous electrolyte secondary batteries which is calculated from the assumed maximum discharge current value, the internal resistance ratio, and a parallel-connected number of the second non-aqueous electrolyte secondary batteries, a capacity value of the second power storage section is set such that a discharge rate of the second non-aqueous electrolyte secondary batteries becomes the preset reference discharge rate or less. The parallel-connected number of the second non-aqueous electrolyte secondary batteries is set such that the discharge rate of each of the second non-aqueous electrolyte secondary batteries is the preset reference discharge rate or less even in a case where the second power storage section is discharged at a current value corresponding to the first assumed maximum discharge current value.

According to the present invention, a discharge rate of one secondary battery is prevented from becoming higher than a predetermined discharge rate in a system where secondary batteries are connected in parallel.

BRIEF DESCRIPTION OF DRAWINGS

FIG. 2 is a measurement result of internal resistance ratio between prismatic lithium ion battery A, and cylindrical lithium ion battery B or cylindrical lithium ion battery BB.

FIG. 4 is a figure showing relation of the parallel-connected number, sharing current per parallel unit, and discharge rate of the cylindrical lithium ion battery B.

DESCRIPTION OF EMBODIMENTS

Figure 1:
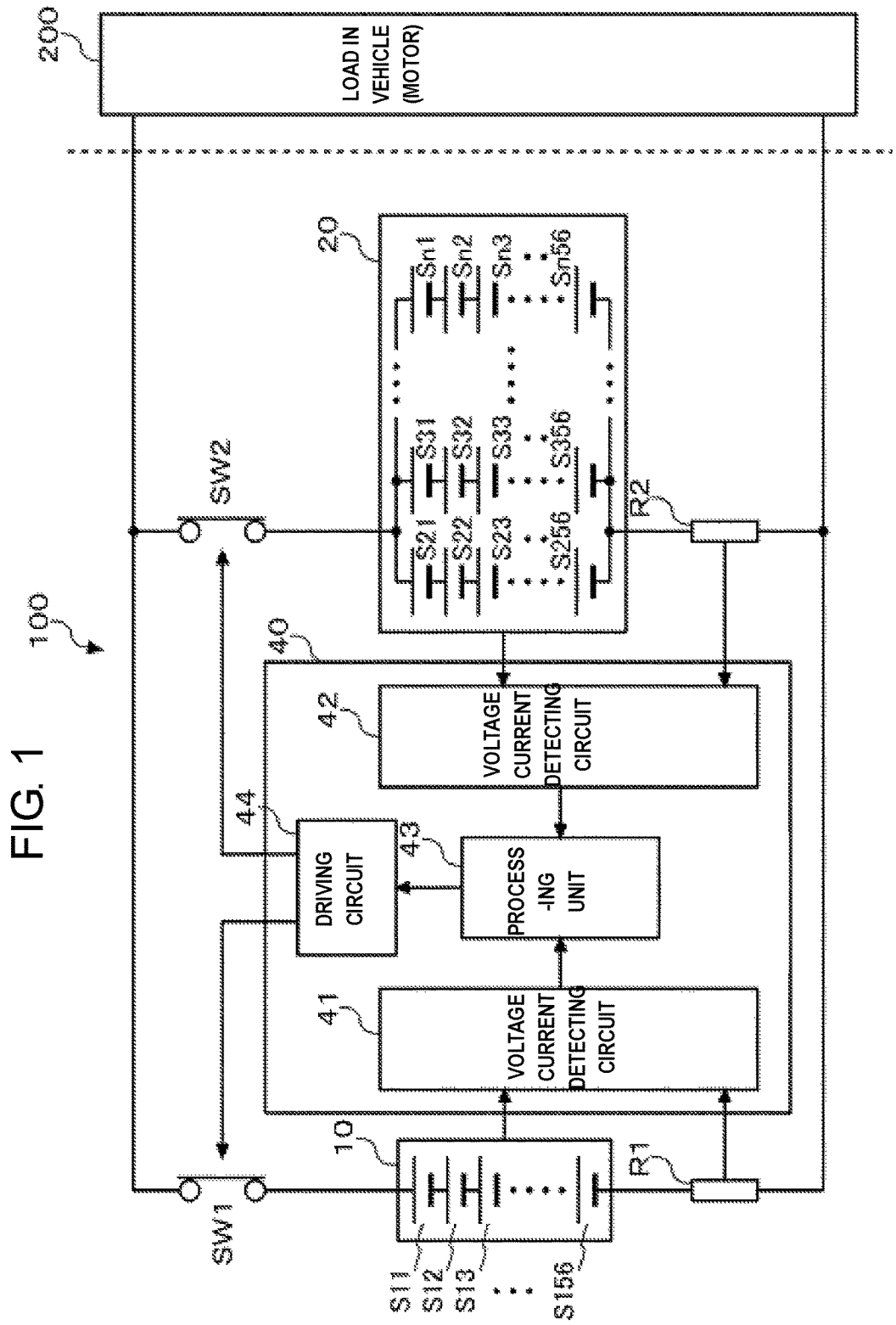
FIG. 1 is a block diagram showing a configuration of a power supply system of one embodiment of the present invention.

FIG. 1 is a block diagram showing a configuration of power supply system 100 of one embodiment of the present invention. Power supply system 100 supplies power to load 200 inside a vehicle, installed in a hybrid car or a electric vehicle. A driving motor is used as load 200 inside the vehicle in the embodiment. Power supply system 100 and the driving motor are connected through a inverter (not shown in the figures). The inverter converts direct current voltage supplied from power supply system 100 to alternate current voltage, to supply to the driving motor. The inverter also converts alternate current voltage supplied from the driving motor to direct current voltage, to supply to power supply system 100.

The driving motor is a three-phase alternate current synchronous motor. It is assumed in the embodiment that the vehicle can drive only by torque from a large size of the driving motor. The driving motor rotates by power supplied from power supply system 100 at the time of power running, to run the vehicle. The driving motor also generates power at the time of regeneration by rotation based on deceleration energy of the vehicle, to supply generated power to power supply system 100.

Power supply system 100 includes first power storage section 10, second power storage section 20, first switch SW1, second switch SW2, first current detecting element R1, second current detecting element R2, and controlling device 40. First power storage section 10 and second power storage section 20 connected in parallel, integrally supply power to load 200. In the embodiment, power supply system 100 has 200 V.

First power storage section 10 includes a plurality of lithium ion battery cells S11 to S156 which are connected in series. The lithium ion battery cell has 3.6 to 3.7 V as a representative voltage. As the embodiment adopts 200 V system, 56 pieces of the lithium ion battery cells S11 to S156 are connected in series.

Second power storage section 20 include a plurality of series-connected battery cell circuits. Then in each of the series-connected battery cell circuits, the lithium ion battery cells are connected in series. The plurality of the series-connected battery cell circuits are connected in parallel. In FIG. 1, 56 pieces of lithium ion battery cells S21 to S256 are connected in series in the first series-connected battery cell circuit, and 56 pieces of lithium ion battery cells S31 to S356 are connected in series in the second series-connected battery cell circuit, . . . , and 56 pieces of lithium ion battery cells Sn1 to Sn56 are connected in series in the nth series-connected battery cell circuit. Then, those series-connected battery cell circuits are connected in parallel.

Here, in first power storage section 10 and second power storage section 20, the lithium ion battery is used, but non-aqueous electrolyte secondary batteries other than the lithium ion battery may be used.

The lithium ion battery cell used in first power storage section 10 and the lithium ion battery cell used in second power storage section 20 have different battery cell configurations. The battery cell adopting a current collecting member (for example, metal board) having low impedance, can improve output property, but has a large volume, compared with the battery cell adopting a current collecting member (for example, foil) having high impedance. Namely, the battery cell adopting the current collecting member of low impedance, tends to comparatively become low energy density, compared with the battery cell adopting the current collecting member of high impedance. Even in the battery cell having the same material composition, the same tendency is shown. As parts other than generating elements in the battery cell become large, its capacity per volume unit decreases, and then its energy density becomes small.

In the system which connects in parallel the battery cell of the low impedance current collecting member and the battery cell of the high impedance current collecting member, the battery cell of the low impedance current collecting member can supply high output power, and the battery cell of the high impedance current collecting member can increase the capacity of the whole system or the capacity per volume unit. While, large current generates heat at the high impedance current collecting member, and it accelerates degradation of the battery cell.

In the embodiment, the lithium ion battery cells having prismatic shapes (rectangular parallelepiped shapes) are used as first power storage section 10, and the lithium ion battery cells having cylindrical shapes are used as second power storage section 20. The cylindrical lithium ion battery cells are widely spread as consumer usage. The prismatic lithium ion battery cells are spread as vehicle usage.

The prismatic lithium ion battery cell adopts the current collecting member of the low impedance, and has high output. On contrast, the cylindrical lithium ion battery adopts the current collecting member of the high impedance, and has high energy density and high capacity. Since the prismatic battery cell and the cylindrical battery cell have the same fundamental generating elements (electrode assembly, electrolyte), they approximately have the same battery property. However, when mechanical parts such as an outer can, area of an electrode plate in an electrode assembly are considered, their outputs or cycle properties are different. As mentioned above, the cylindrical battery cell in which the current collecting member is configured of foil, has high energy density, and high productivity. Here, as the current collecting member has high impedance, high output current accelerates degradation. On contrast, the prismatic battery which is configured of the current collecting member of metal board, does not exceed the cylindrical battery in a view point of energy density, but can suppress degradation even in using high output current.

Therefore, when the prismatic lithium ion battery cell and the cylindrical lithium ion battery cell are connected in parallel in the system, it is necessary that large current does not flow through the cylindrical lithium ion battery cell. Its designing method is described below in detail.

First switch SW1 is inserted between a positive terminal of first power storage section 10 and a high side current bus. Second switch SW2 is inserted between a positive terminal of second power storage section 20 and the high side current bus. The switch such as relay, IGBT, MOSFET, or the like can be used as first switch SW1 or second switch SW2.

First current detecting element R1 is connected between a negative terminal of first power storage section 10 and a low side current bus. Second current detecting element R2 is connected between a negative terminal of second power storage section 20 and the low side current bus. The element such as shunt resistor, or hall element is used as first current detecting element R1 and second current detecting element R2.

Controlling device 40 manages and controls first power storage section 10 and second power storage section 20, and has first voltage and current detecting circuit 41, second voltage and current detecting circuit 42, processing unit 43, and driving circuit 44.

First voltage and current detecting circuit 41 detects voltage in each of the plurality of the lithium ion battery cells S11 to S156 included in first power storage section 10. First voltage and current detecting circuit 41 transmits detected voltage value in each of the battery cells to processing unit 43. Additionally, first voltage and current detecting circuit 41 detects voltage across first current detecting element R1, and transmits current value corresponding to the detected voltage to processing unit 43.

Second voltage and current detecting circuit 42 detects voltage in each of the plurality of the lithium ion battery cells S21 to Sn56 included in second power storage portion 20. Second voltage and current detecting circuit 42 transmits detected voltage value in each of the battery cells to processing unit 43. Additionally, second voltage and current detecting circuit 42 detects voltage across second current detecting element R2, and transmits current value corresponding to the detected voltage to processing unit 43. First voltage and current detecting circuit 41, and second voltage and current detecting circuit 42 can be configured of ASIC (Application Specific Integrated Circuit) as specific custom IC. It may be configured of one or two chips.

Processing unit 43 can be configured of CPU, ROM, and RAM, and can be communicated to vehicle side ECU (Electronic Control Unit) (not shown in the figures) through CAN (Controller Area Network) (not shown in the figures). Processing unit 43 estimates SOC (State Of Charge) of first power storage section 10, based on detected voltage value and/or detected current value by first voltage and current detecting circuit 41. For example, SOC can be estimated by OCV (Open Circuit Voltage) method or current integrating method. As these estimating method are the general knowledge, detailed explanations are omitted. In the same way, processing unit 43 estimates SOC (State Of Charge) of second power storage section 20, based on detected voltage value and/or detected current value by second voltage and current detecting circuit 42.

Processing unit 43 generates control signals for controlling ON/OFF of switch SW1, based on the estimated SOC of first power storage section 10, and/or instruction signals from ECU. For example, when first power storage section 10 is in over-discharge state or over-current flows through first power storage section 10, the control signal for controlling first switch SW1 to be turned off is generated. In the same way, processing unit 43 generates control signals for controlling ON/OFF of switch SW1, based on the estimated SOC of second power storage section 20, and/or instruction signals from ECU. Those control signals are output to driving circuit 44. Driving circuit 44 generates driving signals for turning on/off first switch SW1, and driving signals for turning on/off second switch SW2, based on control signals from processing unit 43.

How to set the capacity and the parallel-connected number of the lithium ion batteries used respectively in first power storage section 10 and second power storage section 20, is explained below. Here, in the embodiment, the parallel-connected number of first power storage section 10 is fixed at one. Namely, the prismatic lithium ion battery cells are not connected in parallel, but only the cylindrical lithium ion battery cells are connected in parallel. By adjusting the parallel-connected number of the cylindrical lithium ion battery cells, it adjusts the capacity of second power storage section 20, and also adjusts the whole capacity of the parallel-connected system configured of first power storage section 10 and second power storage section 20.

Lithium ion battery A having the nominal voltage 3.6 V and the capacity of 25.0 Ah, are used as the prismatic lithium ion battery cells of first power storage section 10. Lithium ion battery B having the nominal voltage 3.6 V and the capacity of 3.0 Ah, the lithium ion battery BB having the nominal voltage 3.6 V and the capacity of 2.0 Ah, are used as the cylindrical lithium ion battery cells of second power storage section 20. Lithium ion battery cells B and lithium ion battery cells BB are 18650 type of the lithium ion battery cell.

FIG. 2 is a measurement result of internal resistance ratio of cylindrical lithium ion battery B or cylindrical lithium ion battery BB to prismatic lithium ion battery A. The section (a) of FIG. 2 is a measurement result of internal resistance ratio of cylindrical lithium ion battery B to prismatic lithium ion battery A, and the section (b) of FIG. 2 is a measurement result of internal resistance ratio of cylindrical lithium ion cell battery BB to prismatic lithium ion battery A.

When prismatic lithium ion battery A, cylindrical lithium ion battery B, and cylindrical lithium ion battery BB are discharged at the same current value, resistance value in each of them is measured. Then, each internal resistance ratio is calculated based on each resistance value measured under the same environment condition. For example, under the environment condition of 25° C., when SOCs of prismatic lithium ion battery A and cylindrical lithium ion battery B are respectively 20%, internal resistance ratio between them is 29.2. Under the environment condition of −10° C., when SOCs of prismatic lithium ion battery A and cylindrical lithium ion battery B are respectively 20%, internal resistance ratio between them is 21.4%.

In the following explanation, it is assumed that prismatic lithium ion battery A is used as the lithium ion battery cell which first power storage section 10 includes, and cylindrical lithium ion battery B is used as the lithium ion battery cell which second power storage section 20 includes. In this case, as shown in the section (a) of FIG. 2, the internal resistance ratio between the lithium ion battery cell included in first power storage section 10 and the lithium ion battery cell included in second power storage section 20, is in the range of 10 to 35 inclusive. More exactly, it is in the range of 20 to 30 inclusive.

An assumed maximum discharge current value of prismatic lithium ion battery A included in first power storage section 10, is calculated from an assumed maximum discharge current value of a parallel-connected system and the above-mentioned internal resistance ratio. An assumed maximum discharge current value of cylindrical lithium ion battery B included in second power storage section 20, is calculated from the assumed maximum discharge current value of the parallel-connected system, the above-mentioned internal resistance ratio, and the parallel-connected number of cylindrical lithium ion battery B. The assumed maximum discharge current value of the parallel-connected system is an assumed maximum value of discharge current which flows from the parallel-connected system to load 200. In the following example, it is assumed as 50 A.

A capacity value of first power storage section 10 is set such that a discharge rate of prismatic lithium ion battery A becomes a preset reference discharge rate or less, based on the assumed maximum discharge current value of prismatic lithium ion battery A. A capacity value of second power storage section 20 is set such that a discharge rate of cylindrical lithium ion battery B becomes the preset reference discharge rate or less, based on the assumed maximum discharge current value of cylindrical lithium ion battery B. In the following example, the preset reference discharge rate is set at 5.0 C. This preset reference discharge rate is determined by battery designer, based on experiments, simulations, experiences, or the like.

When tentatively the parallel-connected number of cylindrical lithium ion battery B is 1 and the above-mentioned internal resistance ratio is 24, the assumed maximum discharge current value of cylindrical lithium ion battery B is 2.4 A. As the capacity value of cylindrical lithium ion battery B is 3.0 Ah, its discharge rate is 0.8 C, and its value is equal to or less than the preset reference discharge rate.

However, even when the capacity value of cylindrical lithium ion battery B and the parallel-connected number is set according to the above-mentioned method based on experiments of inventors of the present invention, it happens that the discharge rate of cylindrical lithium ion battery B exceeds the preset reference discharge rate.

Figure 3:
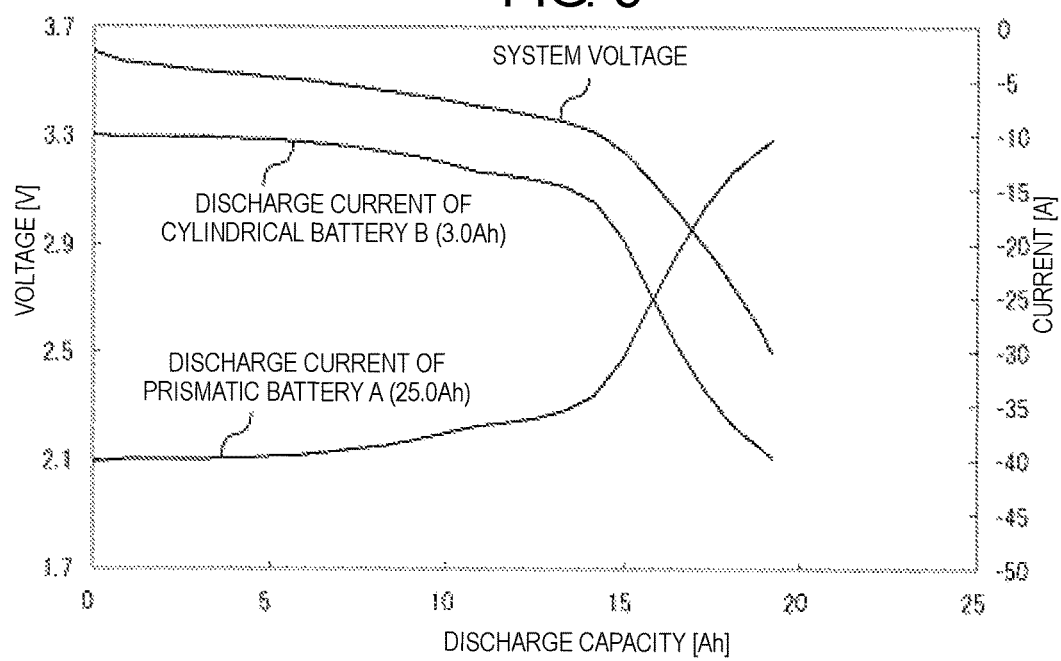
FIG. 3 is a figure showing transitions of system voltage, discharge current of the prismatic lithium ion battery A, and discharge current of the cylindrical lithium ion battery B, when a parallel system of the prismatic lithium ion battery A and the cylindrical lithium ion battery B is discharged at a constant current of 50 A.

FIG. 3 is a figure showing transitions of system voltage, discharge current of prismatic lithium ion battery A, and discharge current of cylindrical lithium ion battery B, when a parallel system of the prismatic lithium ion battery A and the cylindrical lithium ion battery B is discharged at a constant current of 50 A. Cylindrical lithium ion battery B is parallel-connected in a preset parallel-connected number, such that the resistance ratio of prismatic lithium ion battery A and cylindrical lithium ion battery B is 1:4. The whole capacity of the parallel-connected system is 40 Ah, and discharge is started from a state where SOC of the parallel-connected system is 50%. The voltage of the discharge start in the parallel-connected system is 3.7 V, and the voltage of the discharge end is 2.5 V.

At early stage of discharge, shared currents of prismatic lithium ion battery A and cylindrical lithium ion battery B are decided according to the internal resistance ratio measured under the same condition. However, as time goes, the shared current of cylindrical lithium ion battery B increases quickly. This is thought as following. As the discharge progresses, the difference of SOCs between prismatic lithium ion battery A and cylindrical lithium ion battery B, becomes large, and the internal resistance ratio does not change as it is estimated. As SOC of prismatic lithium ion battery A decreases more quickly, the internal resistance of prismatic lithium ion battery A increases more quickly (refer to FIG. 2), and the internal resistance ratio becomes small.

As shown in FIG. 3, as the discharge progresses, the internal resistances in both of them are overturned, and then discharge currents of cylindrical lithium ion battery B and prismatic lithium ion battery A are overturned. When system voltage reaches discharge end voltage of 2.5 V, discharge current of cylindrical lithium ion battery B becomes 40.0 A, and discharge current of prismatic lithium ion battery A becomes 10.0 A. This is the inverse relationship with the early stage of discharge.

Considering the above-mentioned knowledge, the parallel-connected number of cylindrical lithium ion battery B is determined such that discharge rate of cylindrical lithium ion battery B becomes equal to or less than the preset reference discharge rate, even when second power storage section 20 is discharged at current value corresponding to the assumed maximum discharge current value of prismatic lithium ion battery A. In the example of FIG. 3, the assumed maximum discharge current value of prismatic lithium ion battery A is 40.0 A. The parallel-connected number of cylindrical lithium ion battery B is decided based on not 10.0 A, but 40.0 A.

Generally, discharge current value of cylindrical lithium ion battery B at discharge end voltage of the parallel-connected system does not exceed the assumed maximum discharge current value of prismatic lithium ion battery A. When the parallel-connected number is decided based on the assumed maximum discharge current value of prismatic lithium ion battery A, discharge rate of cylindrical lithium ion battery B does not exceed the preset reference discharge rate.

FIG. 4 is a figure showing relation of the parallel-connected number, sharing current per parallel unit, and discharge rate of cylindrical lithium ion battery B. As the assumed maximum discharge current value is 40.0 A, shared current per parallel unit in the case of the parallel-connected number of 1, is 40.0 A. As the capacity of cylindrical lithium ion battery B is 3.0 Ah, discharge rare in this case, is 13.3 C. As the preset reference discharge rate is set at 5.0 C, the configuration of the parallel-connected number of 1 does not satisfy the condition of discharge rate. In a case of the parallel-connected number of 2, shared current per parallel unit is 20.0 A. Discharge rare in this case, is 6.7 C, and even the configuration of the parallel-connected number of 2 does not satisfy the condition of discharge rate. In a case of the parallel-connected number of 3, shared current per parallel unit is 13.3 A. Discharge rare in this case, is 4.4 C, and then the configuration of the parallel-connected number of 3 satisfies the condition of discharge rate. Naturally, cases of the parallel-connected number of more than 3, satisfy the condition of discharge rate.

Therefore, the parallel-connected number of cylindrical lithium ion battery B included in second power storage section 20, is set at equal to or more than 3. Here, when the parallel-connected number exceeds 9, the capacity of second power storage section 20 exceeds 27.0 Ah, and then also exceeds the capacity of first power storage section 10. In this case, manufacturing cost in which batteries having different shapes are connected in parallel, is increased. Then, parallel-connecting two of prismatic lithium ion battery A of 25.0 Ah is lower cost. Therefore, preferably, the parallel-connected number of cylindrical lithium ion battery B included in second power storage portion 20 is set in the range of 3 to 8.

As explained above, according to the embodiment, in the system where the prismatic lithium ion battery and the cylindrical lithium ion battery are parallel-connected, it can prevent discharge rate of the cylindrical lithium ion battery from exceeding the cylindrical lithium ion battery. Therefore, it has a merit of the parallel-connected system that the assembled battery has high output and high capacity, and also can perfectly protects the cylindrical lithium ion battery.

The cylindrical lithium ion battery has lower durability, compared with that of the prismatic lithium ion battery. As degradation of the cylindrical lithium ion battery is suppressed, it can prevent difference in the lifetimes of both from becoming big. As discharge rate of the cylindrical lithium ion battery is suppressed, it is not necessary to add specific protecting structure to the cylindrical lithium ion battery. Therefore, it is technically important to design such that discharge rate of the cylindrical lithium ion battery is suppressed at the preset reference discharge rate or less.

Conventionally, in the parallel-connected system of the prismatic lithium ion battery and the cylindrical lithium ion battery, their capacity values and the parallel-connected number are decided according to internal resistance ratio measured under the same condition. Originally, when internal resistance ratio of both is considered, it is thought that current hardly flows through the cylindrical lithium ion battery. However, actually, according to the experiments, there is some possibility that large current is discharged from the cylindrical lithium ion battery. Namely, shared currents are not decided only by internal resistance ratio measured under the same condition. In the embodiment, even when large current is discharged from second power storage section 20, the discharge rate of the cylindrical lithium ion battery included in second power storage section 20 is suppressed under 5.0 C inclusive, and then it can protect the cylindrical lithium ion battery.

In the electric vehicle, the prismatic lithium ion battery is discharged till around SOC 10%, and then discharge voltage is decreased near 2.5 V. Therefore, there is some possibility that large current is discharged from the cylindrical lithium ion battery, and such a possibility cannot be ignored.

The above explanation is made based on the embodiments of the present invention. The person of the ordinary skill in the art can understand that these embodiments are illustrated, and these constitution elements and these combined processes can be modified, and such modified examples are covered by the scope of the present invention.

For example, when lithium ion battery BB having nominal voltage 3.6 V and capacity 2.0 Ah is used as a lithium ion battery cell included in second power storage section 20, the above-mentioned design method can be applied. Further, in a parallel-connected system of prismatic lithium ion battery and cylindrical lithium ion battery having capacity values other than the above-mentioned values, the above-mentioned design method can be applied.

The invention claimed is:

1. A power supply system comprising:
   a first power storage section including a first non-aqueous electrolyte secondary battery; and
   a second power storage section connected to the first power storage section in parallel, and including a plurality of parallel-connected second non-aqueous electrolyte secondary batteries,
   wherein the second non-aqueous electrolyte secondary batteries each have a higher energy density than an energy density of the first non-aqueous electrolyte secondary battery,
   wherein an internal resistance ratio of each of the second non-aqueous electrolyte secondary batteries to the first non-aqueous electrolyte secondary battery is set at a range of 10 to 35 inclusive,
   wherein based on an assumed maximum discharge current value of a parallel-connected system of the first power storage section and the second power storage section, and a first assumed maximum discharge current value of the first non-aqueous electrolyte secondary battery which is calculated from the internal resistance ratio, a capacity value of the first power storage section is set such that a discharge rate of the first non-aqueous electrolyte secondary battery becomes a preset reference discharge rate or less,
   wherein based on a second assumed maximum discharge current value of the second non-aqueous electrolyte secondary batteries which is calculated from the assumed maximum discharge current value, the internal resistance ratio, and a parallel-connected number of the second non-aqueous electrolyte secondary batteries, a capacity value of the second power storage section is set such that a discharge rate of each of the second non-aqueous electrolyte secondary batteries is the preset reference discharge rate or less, and
   wherein the parallel-connected number of the second non-aqueous electrolyte secondary batteries is set such that the discharge rate of each of the second non-aqueous electrolyte secondary batteries is the preset reference discharge rate or less even in a case where the second power storage section is discharged at a current value corresponding to the first assumed maximum discharge current value.

2. The power supply system according to claim 1,
   wherein the parallel-connected number of the second non-aqueous electrolyte secondary batteries is set such that the capacity value of the second power storage section is less than the capacity value of the first power storage section.

3. The power supply system according to claim 1,
   wherein the preset reference discharge rate is set at 5.0 C.

4. The power supply system according to claim 3,
   wherein the first non-aqueous electrolyte secondary battery is a prismatic battery having the capacity value of 25.0 Ah, and
   each of the second non-aqueous electrolyte secondary batteries is a cylindrical battery having the capacity value of 3.0 Ah, and
   the parallel-connected number of the second non-aqueous electrolyte secondary batteries is set at a range of 3 to 8 inclusive.

5. The power supply system according to claim 2,
   wherein the preset reference discharge rate is set at 5.0 C.

6. The power supply system according to claim 5,
   wherein the first non-aqueous electrolyte secondary battery is a prismatic battery having the capacity value of 25.0 Ah, and
   each of the second non-aqueous electrolyte secondary batteries is a cylindrical battery having the capacity value of 3.0 Ah, and
   the parallel-connected number of the second non-aqueous electrolyte secondary batteries is set at a range of 3 to 8 inclusive.

* * * * *